(12) United States Patent
Araki et al.

(10) Patent No.: US 7,891,409 B2
(45) Date of Patent: Feb. 22, 2011

(54) AIR CONDITIONER FOR VEHICLE

(75) Inventors: Daisuke Araki, Saitama (JP); Hiroshi Tsuzuki, Saitama (JP); Yoshihiro Sekiya, Saitama (JP); Keisuke Hara, Saitama (JP)

(73) Assignee: Valeo Thermal Systems Japan Corporation, Saitama (JP)

( * ) Notice: Subject to any disclaimer, the term of this patent is extended or adjusted under 35 U.S.C. 154(b) by 788 days.

(21) Appl. No.: 11/918,854

(22) PCT Filed: Oct. 24, 2005

(86) PCT No.: PCT/JP2005/019469

§ 371 (c)(1),
(2), (4) Date: Oct. 19, 2007

(87) PCT Pub. No.: WO2006/114909

PCT Pub. Date: Nov. 2, 2006

(65) Prior Publication Data

US 2009/0049853 A1    Feb. 26, 2009

(30) Foreign Application Priority Data

Apr. 21, 2005    (JP) .............................. 2005-123279

(51) Int. Cl.
*B60H 1/00*    (2006.01)

(52) U.S. Cl. ............................ 165/42; 165/43; 165/204; 454/121; 454/126; 454/127; 454/156; 454/160; 454/161; 237/12.3 A; 237/12.3 B; 296/70; 296/72; 296/208; 62/244

(58) Field of Classification Search .................... 165/42, 165/43, 204; 454/121, 126, 127, 156, 160, 454/161; 237/12.3 A, 12.3 B; 296/70, 72, 296/208; 62/244
See application file for complete search history.

(56) References Cited

U.S. PATENT DOCUMENTS

| 6,629,424 | B1 * | 10/2003 | Araki et al. | ................... | 62/244 |
| 6,904,763 | B2 * | 6/2005 | Araki et al. | ................. | 454/121 |
| 7,096,924 | B2 * | 8/2006 | Araki et al. | ................... | 165/42 |

(Continued)

FOREIGN PATENT DOCUMENTS

JP    08119144 A  *  5/1996

(Continued)

OTHER PUBLICATIONS

International Search Report mailed on Jan. 10, 2006.

*Primary Examiner*—John K Ford
(74) *Attorney, Agent, or Firm*—Rader, Fishman & Grauer PLLC

(57) ABSTRACT

Noise occurring in an upright air-conditioning unit is greatly reduced. An upright air-conditioning unit 1 is disposed under a steering member support part 23, a vent opening 15 and a vent outlet port 20 are made to communicate with each other via a vent duct 25, a defrost opening 16 and a defrost outlet port 21 are made to communicate with each other via a defrost duct 26. The vent opening 15 assumes a position further frontward than the steering member support part 23 along the frontward/rearward direction relative to the vehicle body whereas the defrost opening 16 assumes a position further rearward than the steering member support part 23 along the frontward/rearward direction relative to the vehicle body.

3 Claims, 4 Drawing Sheets

U.S. PATENT DOCUMENTS

2003/0230103 A1 * 12/2003 Araki et al. .................... 165/42
2006/0144583 A1 * 7/2006 Araki et al. .................. 165/204

FOREIGN PATENT DOCUMENTS

| JP | 11227453 A | * | 8/1999 |
| JP | 2000135920 A | * | 5/2000 |
| JP | 2000335229 A | * | 12/2000 |
| JP | 2001-105833 A | | 4/2001 |
| JP | 2002-219925 A | | 8/2002 |
| JP | 2003-326948 A | | 11/2003 |

* cited by examiner (a)

(b)

AIR CONDITIONER FOR VEHICLE

TECHNICAL FIELD

The present invention relates to an air-conditioning system installed in an automobile, and more specifically, it relates to a vent opening and a defrost opening formed in an air-conditioning unit.

BACKGROUND ART

An air-conditioning unit 100 in the related art shown in FIG. 4, commonly known as an upright-type air-conditioning unit, includes a vent opening 103 communicating with a vent outlet port 102 through which air is delivered toward the upper part of the occupant's body and a defrost opening 105 communicating with a defrost outlet port 104 through which air is directed toward the windshield F, both formed at the top of the unit case 101. In addition, a steering member support part 106 extending along the width of the vehicle (along the left/right direction relative to the vehicle body) is disposed to range across the space near the air-conditioning unit 100, and a defrost duct 108 (or a vent duct 107) so as to bypass the steering member support part 106 in the regular layout. In the air-conditioning unit 100 in the related art structured as described above, the vent opening 103 and the defrost opening 105 are normally disposed respectively on the rear side and on the front side along the frontward/rearward direction relative to the vehicle body. FIG. 5 schematically illustrates the structure of the vent duct 107 in an air-conditioning system equipped with this air-conditioning unit 100. The vent duct 107 includes two central communication passages 107a communicating with a central vent outlet port 102a present substantially at the midpoint along the width of the vehicle (along the left/right direction) within the cabin and two side communication passages 107b communicating with side vent outlet ports 102b each present at one of the two ends along the width of the vehicle inside the cabin.

The inventions disclosed in the related art in relation to automotive air-conditioning units include the following. In the automotive air-conditioning system disclosed in patent reference literature 1, central vent (central face) openings are formed at the two ends of the air-conditioning unit along the width of the vehicle and a side vent (side face) opening is formed at the center of the air-conditioning unit along the vehicle width so as to increase the flow rate with which air is let out by reducing the extent of pressure loss over the area corresponding to the central communication passages 107a mentioned earlier.

Patent reference literature 1: Japanese Unexamined Patent Publication No. 2003-326948 (see paragraphs 0010~0012, FIGS. 1 and 7)

DISCLOSURE OF THE INVENTION

Problems to be Solved by the Invention

It has been confirmed that noise occurring mainly due to turbulence in the unit case in an air-conditioning system travels through ducts to reach the cabin. This means that it is crucial to prevent the occurrence of turbulence inside the unit case and to attenuate any turbulence (pulsation) having occurred to a sufficient extent before it reaches the space inside the cabin, in order to reduce the noise level.

In the upright air-conditioning unit in the related art shown in FIG. 4 with the vent opening 103 and the defrost opening 105 formed at the unit case 2 respectively on the rear side and on the front side along the frontward/rearward direction relative to the vehicle body, cool air let out through the vent outlet port 103 assumes a flow whereby it moves across the space inside the unit case 101 from the front side toward the rear side as indicated by the solid line arrow A and warm air let out through the defrost outlet port 104 assumes a flow whereby it moves across the space inside the unit case 101 from the rear side toward the front side as indicated by the dotted line arrow B. These air flows tend to induce turbulence inside the unit case 101 in the related art.

In addition, since the vent opening 103 is formed at the unit case 101 on the rear side toward the cabin, the central communication passages 107a (see FIG. 5(a)) at the vent duct 107 are bound to be much shorter than the side communication passages 107b. This gives rise to a problem in that turbulence having occurred in the unit case 101 cannot be sufficiently attenuated through the central communication passages 107a due to their short length. Furthermore, the difference between the length of the communication passages 107a and the length of the communication passages 107b increases the imbalance in the airflow resistance in the vent duct 107. This imbalance, in turn, causes uneven distribution of air over the central area and over the side areas with more air distributed over the central area, necessitating installation of means such as baffle plates or restricting portions 110 (see FIG. 5(b)) at the central communication passages 107a to address the issue of the uneven air distribution.

Since the structure disclosed in patent reference literature 1 does not effectively prevent the occurrence of turbulence inside the unit case or attenuate turbulence that has occurred, there is still a great deal that may be done to reduce the extent of noise.

Accordingly, an object of the present invention is to greatly reduce noise in an air-conditioning system equipped with an upright-type air-conditioning unit.

Means for Solving the Problems

The object described above is achieved in the present invention by providing an automotive air-conditioning system equipped with an air-conditioning unit disposed under a steering member support part 23, which includes a blower 3, an evaporator 5 and a heater core 6 disposed substantially along a longitudinal direction inside a unit case 2, with the evaporator disposed on the front side along a frontward/rearward direction relative to the vehicle body, the heater core 6 disposed on the rear side along the frontward/rearward direction relative to the vehicle body, and a vent opening 15 to communicate with a vent outlet port 20 formed inside the cabin and a defrost opening 16 to communicate with a defrost outlet port 21 formed inside the cabin both formed at the unit case, as shown in FIG. 1. The vent opening 15 and the vent outlet port 20 are made to communicate with each other via a vent duct 25 and the defrost opening 15 and the defrost outlet port 21 are made to communicate with each other via a defrost duct 26. The automotive air-conditioning system is characterized in that the vent opening 15 assumes a position further frontward along the frontward/rearward direction relative to the vehicle body than the steering member support part 23 and that the defrost opening 16 assumes a position further rearward along the frontward/rearward direction than the steering member support part 23 along the frontward/rearward direction relative to the vehicle body (claim 1).

By forming the vent opening 15 at the unit case 2 on the front side and forming the defrost opening 16 at the unit case 2 on the rear side, as described above, cool air (see the arrow A) flowing toward the vent opening 15 or warm air (see the arrow B) flowing toward the defrost opening 16 does not move across the space within the unit case 2 along the frontward/rearward direction as in the related art. The air instead advances upward substantially linearly. As a result, the occurrence of turbulence inside the unit case 2 is prevented and ultimately, the noise level is reduced. In addition, since the vent opening 15 and the defrost opening 16 are disposed on the two sides of the steering member support part 23, a higher level of flexibility is afforded with regard to the shape of the vent duct 25 to facilitate design adjustment or performance adjustment.

It is desirable that the vent duct 25 in the structure disclosed in claim 1 include central communication passages 25a communicating with central vent outlet ports 20a formed in the cabin at a substantial center along the width of the vehicle and that the central communication passages 25 bypass the steering member support part 23 by ranging above the steering member support part 23 and also bypass the defrost opening 16 formed at the unit case 2 by ranging on the two sides of the defrost opening 16 along the width of the vehicle so as to extend rearward along the frontward/rearward direction relative to the vehicle body, as shown in FIG. 2 (claim 2).

The structure described above allows the central communication passages 25a to extend over a greater length compared to the related art and, as a result, noise (pulsation due to turbulence) having occurred inside the unit case 2 can be attenuated to a sufficient extent through the central communication passages before the noise reaches the central vent outlet ports 20a. In addition, since the structure allows the duct length to be adjusted to reduce the difference between the length of the central communication passages 25a and the length of side communication passages 25b communicating between side vent outlet ports 20b formed inside the cabin substantially at the two ends along the width of the vehicle and the vent opening 15 with better ease than in the related art, uniformity is achieved more easily with regard to the airflow resistance inside the vent duct 25 to further reduce the noise and further improve the air distribution. Furthermore, since the two central vent outlet ports 20a and 20a can be formed over a distance from each other along the width of the vehicle in conjunction with the central communication passages 25a, installation space for a device such as a navigation system or an audio device is created with ease between the two central vent outlet ports 20a and 20a.

Also, it is desirable that the defrost duct 26 in the structure disclosed in claim 2 bypass the steering member support part 23 and the vent duct 25 by ranging above them to extend toward the front side of the vehicle, as shown in FIGS. 2 and 3 (claim 3).

By adopting the structure described above, it is ensured that the defrost duct 26 is installed by bypassing the steering member support part 23 and the vent duct 25 through efficient utilization of the installation space.

Figure 1:
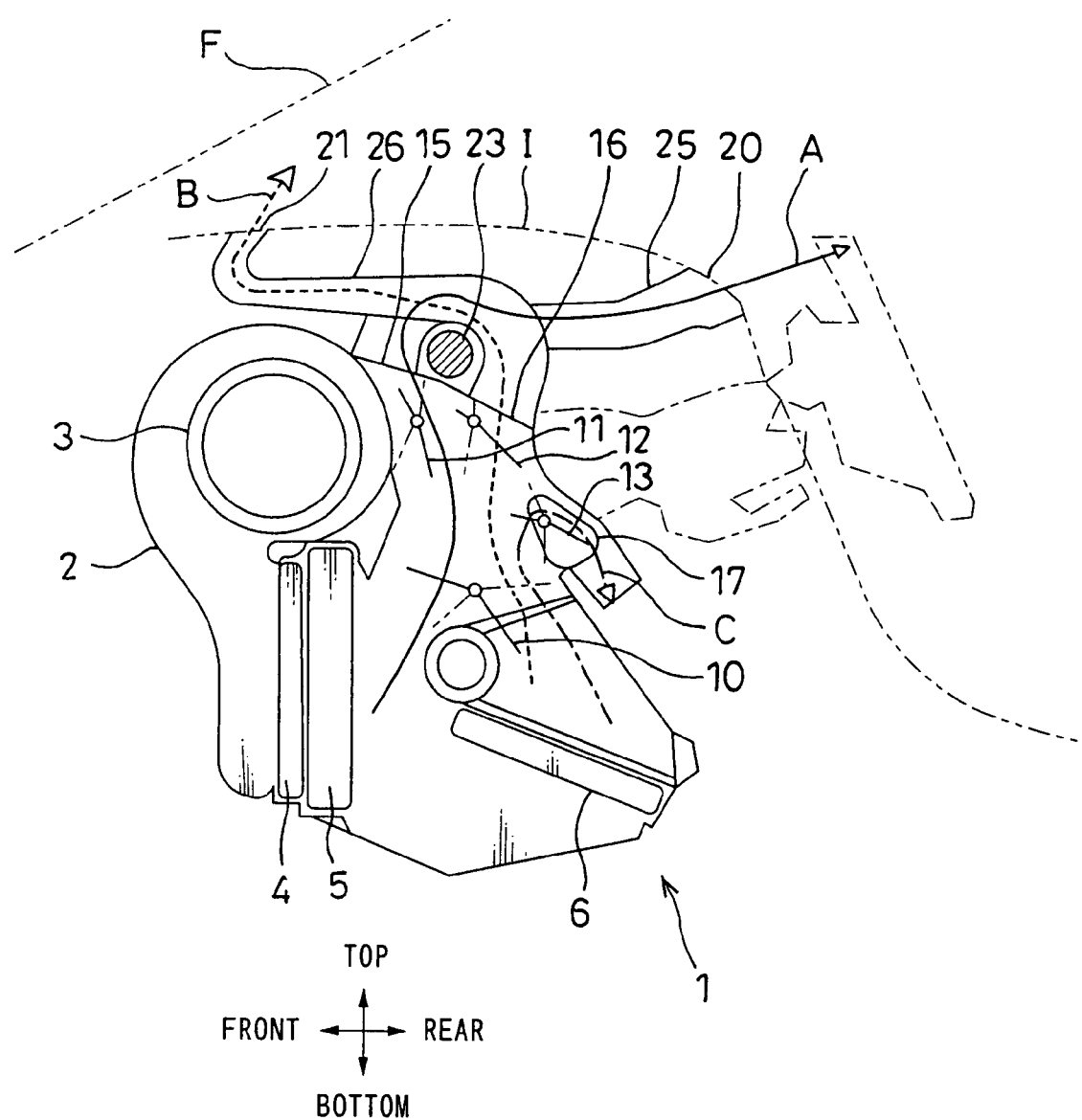
FIG. 1 shows the structure adopted in the automotive air-conditioning system according to the present invention.

EXPLANATION OF REFERENCE NUMERALS 1 air-conditioning unit
2 unit case
3 blower
4 filter
5 evaporator
6 heater core
10~13 air mix door
15 vent opening
16 defrost opening
20 vent outlet port
20a central vent outlet port
20b side vent outlet port
21 defrost outlet port
21a front defrost outlet port
21b side defrost outlet port
25 vent duct
25a central communication passage
25b side communication passage
26 defrost duct
26a front communication passage
26b side communication passage
A cool air
B, C warm air
F windshield
I instrument panel

BEST MODE FOR CARRYING OUT THE INVENTION

An embodiment of the present invention is now explained in reference to the attached drawings. An air-conditioning unit 1 in FIG. 1 is an upright air-conditioning unit with a blower 3, an evaporator 5 and a heater core 6 disposed substantially along the longitudinal (up/down) direction inside the unit case 2 installed in a center console unit. The unit case 2 houses therein the blower 3, a filter 4, the evaporator 5, the heater core 6, a warm air/cool air selector door 10, a vent selector door 11, a defrost selector door 12, a foot selector door 13 and the like, with a vent opening 15, a defrost opening 16 and a foot opening 17 formed at the top surface of the unit case 2. The vent opening 15 and a vent outlet port 20 formed at a surface of an instrument panel I facing opposite the passenger compartment are made to communicate with each other via a vent duct 25, the defrost opening 16 and a defrost duct outlet port 21 formed to enable defogging of the windshield F and the like are made to communicate with each other via a defrost duct 26 and the foot opening 17 and a foot outlet port (not shown) are made to communicate with each other via a specific duct (not shown).

In the air-conditioning unit 1 according to the present invention, the evaporator 5 and the heater core 6 are respectively disposed on the front side and the rear side along the frontward/rearward direction relative to the vehicle body. The solid line arrow A indicates the flow of cool air and the dotted line arrow B and the one-point chain line arrow C indicate the flow of warm air in FIG. 1. As these arrows indicate, the cool air A flows through the front side and the warm air B flows through the rear side in the unit case 2. In addition, during a regular air-conditioning operation, the cool air A is output through the vent outlet port 20 and the warm air B is output through the defrost outlet port 21 or the foot outlet port.

The vent opening 15 assumes a position further frontward than the steering member support part 23 along the frontward/rearward direction relative to the vehicle body and the defrost opening 16 assumes a position further rearward than the steering member support part 23 along the frontward/rearward direction.

As described above, in the air-conditioning unit 1 according to the present invention with the vent opening 15 and the defrost opening 16 formed at the unit case 2 on the front side and on the rear side respectively, cool air A flowing to the vent opening 15 or warm air B flowing toward the defrost opening 16 does not move across the space within the unit case 2 along the frontward/rearward direction as in the related art. The air instead advances upward substantially linearly. As a result, the occurrence of turbulence inside the unit case 2 is prevented and ultimately, the noise level is reduced.

Figure 2:
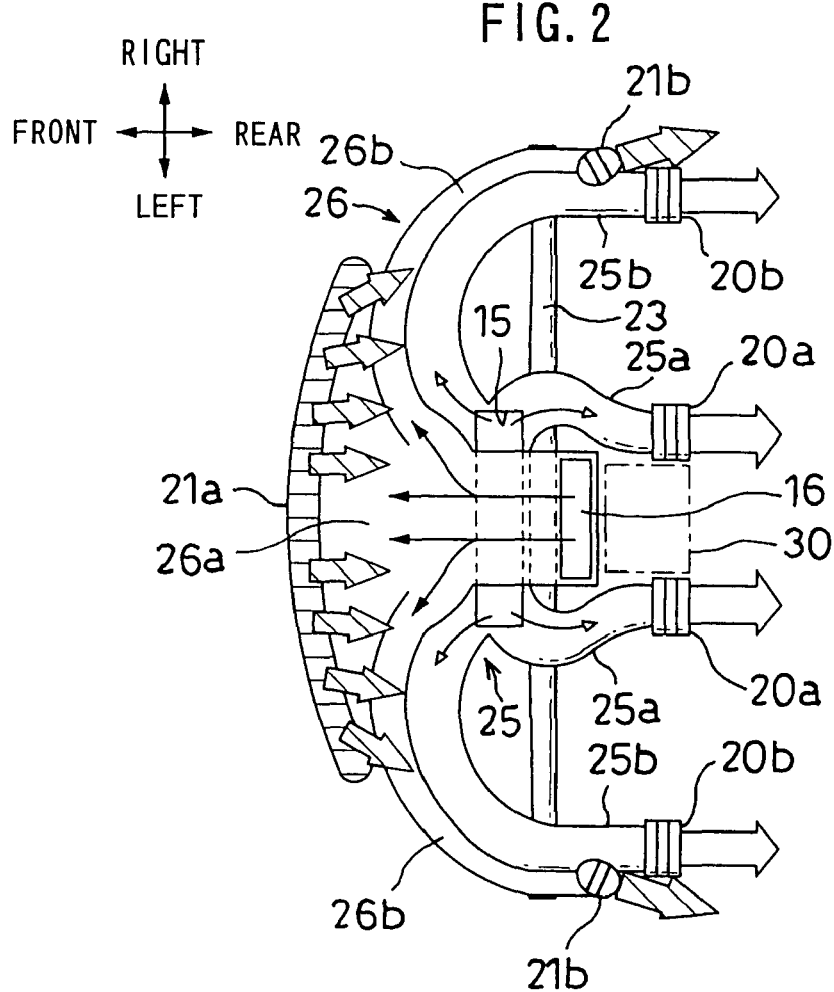
FIG. 2 is a top view showing the structures adopted in the vent duct and the defrost duct in the automotive air-conditioning system according to the present invention.
Figure 3:
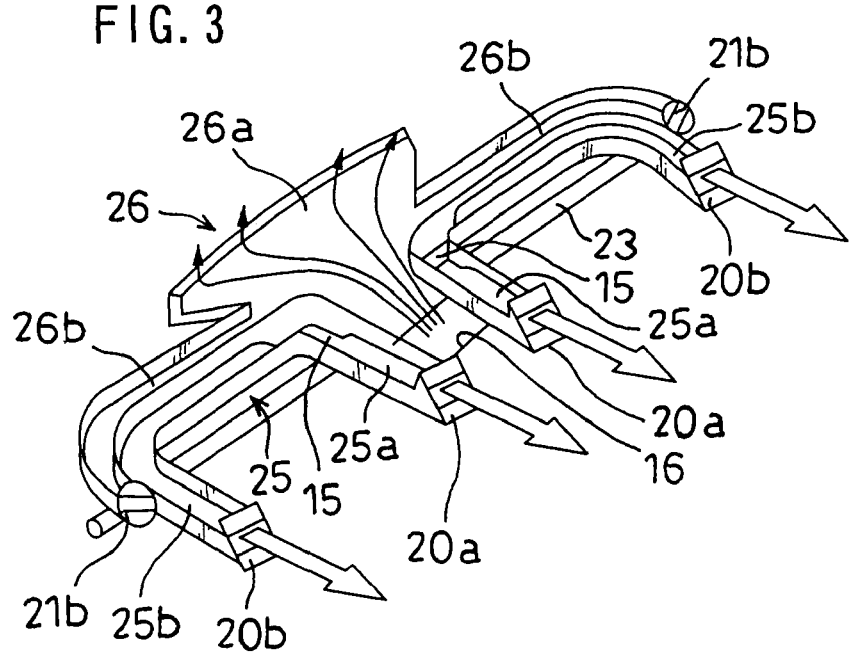
FIG. 3 is a perspective showing the structures adopted in the vent duct and the defrost duct in the automotive air-conditioning system according to the present invention.
Figure 4:
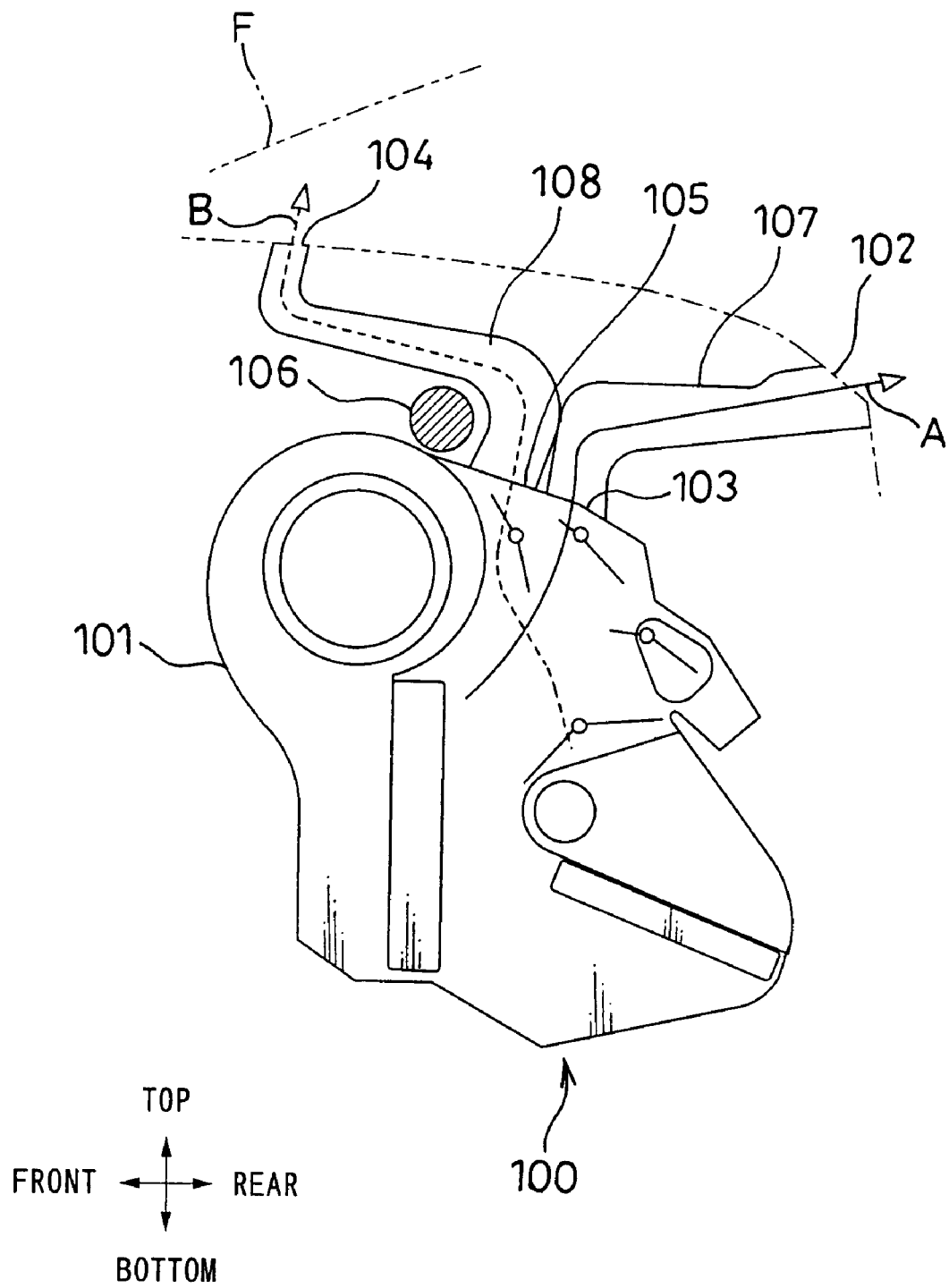
FIG. 4 shows the structure adopted in an air-conditioning unit in the related art.
Figure 5:
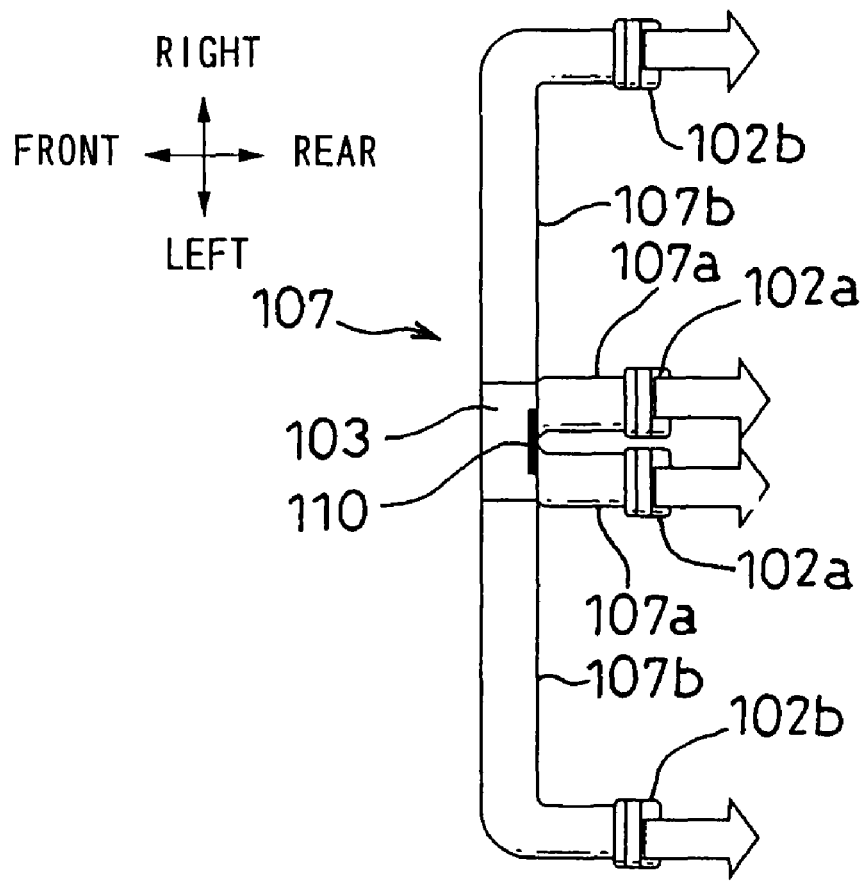
FIGS. 5(a) and 5(b) show the structure of the vent duct in an automotive air-conditioning system in the related art.
Figure 5:
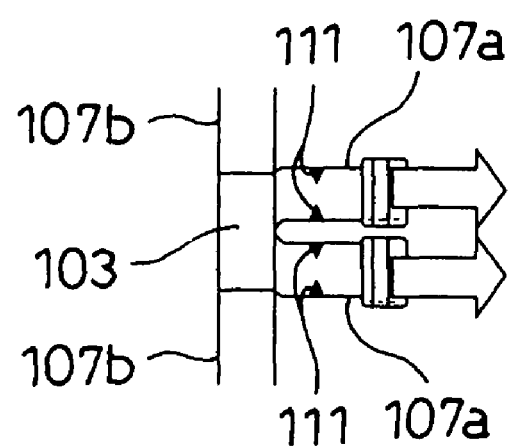

FIGS. 2 and 3 show examples of structures that may be adopted for the vent duct 25 and the defrost duct 26. In the cabin, central vent outlet ports 20a and side vent outlet ports 20b are formed as vent outlet ports 20, whereas front defrost outlet ports 21a present near the bottom of the windshield F to extend along the width (along the left/right direction) of the vehicle and side defrost outlet ports 21b set further outward relative to the side vent outlet ports 20b along the width of the vehicle are formed as defrost outlet ports 21. Each vent ducts 25 each include a central communication passage 25a communicating between the vent opening 15 and a central vent outlet port 20a and a side communication passage 20b communicating between the vent opening 15 and side vent outlet ports 20b. The defrost duct 26 includes a front communication passage 26a communicating between the defrost opening 16 and the front defrost outlet ports 21a and side communication passages 26b communicating between the defrost opening 16 and the side defrost outlet ports 21b. The front communication passage 26a at the defrost duct 26 assumes a substantially fan shape and the side communication passages 26b are formed so as to branch out toward the two sides as the fan-shaped front communication passage 26a widens.

The vent duct 25 ranging upright from the two ends of the vent opening 15 along the width of the vehicle and bypassing the steering member support part 23 by ranging above the steering member support part 23 extend rearward along the frontward/rearward direction relative to the vehicle body. The central communication passages 25 curve toward the outside along the width of the vehicle so as to bypass the defrost opening 16 formed at the unit case 2, whereas the side communication passages 25b curve slightly toward the front side along the frontward/rearward direction relative to the vehicle body (see FIG. 2). By adjusting the curvatures of the communication passages 25a and 25b, uniformity in airflow resistance inside the vent ducts 25 can be achieved.

The defrost duct 26 ranging upright from the defrost opening 16, bypasses the steering member support part 23 and the centers of the vent ducts 25 by ranging above them and extend frontward along the frontward/rearward direction relative to the vehicle body. Namely, the vent ducts 25 and the defrost duct 26, dispose through grade separation, do not intersect each other.

The structure described above allows the central communication passages 25a to extend over a greater length compared to the related art and, as a result, noise (pulsation due to turbulence) having occurred inside the unit case 2 can be attenuated to a sufficient extent through the central communication passages before the noise reaches the central vent outlet ports 20a. In addition, since the structure reduces the difference between the length of the central communication passages 25a and the length of the side communication passages 25b, uniformity in the airflow resistance in the vent duct 25 is assured and the noise level is further reduced. Furthermore, the two central vent outlet port 20a and 20a can be formed over a distance from each other along the width of the vehicle, installation space for a device such as a navigation system or an audio device is created with ease between the two central vent outlet ports 20a and 20a.

The invention claimed is:

1. An air conditioner for a vehicle equipped with an air-conditioning unit disposed under a steering member support part, which includes a blower, an evaporator and a heater core disposed substantially along a longitudinal direction inside a unit case, with said evaporator disposed on the front side along a frontward/rearward direction relative to the vehicle body, said heater core disposed on the rear side along the frontward/rearward direction relative to the vehicle body, a vent opening to communicate with a vent outlet port in an instrument panel formed inside a vehicle cabin and facing away from a windshield of the vehicle and a defrost opening to communicate with a defrost outlet port formed inside the vehicle cabin facing toward the windshield, both openings formed at said unit case, said vent opening and said vent outlet port made to communicate with each other via a vent duct and said defrost opening and the defrost outlet port made to communicate with each other via a defrost duct,
wherein said vent opening assumes a position further frontward than said steering member support part along the frontward/rearward direction relative to the vehicle body; and
wherein said defrost opening assumes a position further rearward than said steering member support part along the frontward/rearward direction relative to the vehicle body.

2. An air conditioner for vehicle according to claim 1,
wherein said vent duct includes central communication passages communicating with a central vent outlet port formed in the cabin at a substantial center along the width of the vehicle; and
wherein said central communication passage bypasses said steering member support part by being arranged above said steering member support part and also bypasses said defrost opening formed at said unit case by being arranged on the two sides of said defrost opening along the width of the vehicle so as to extend rearward along the frontward/rearward direction relative to the vehicle body.

3. An air conditioner for vehicle according to claim 2,
wherein said defrost duct bypasses said steering member support part and said vent duct by being arranged above said steering member support part and said vent duct to extend toward the front side of the vehicle.

* * * * *